US012315435B2

(12) United States Patent
Chae

(10) Patent No.: US 12,315,435 B2
(45) Date of Patent: *May 27, 2025

(54) DISPLAY DEVICE

(71) Applicant: SAMSUNG DISPLAY CO., LTD., Yongin-si (KR)

(72) Inventor: Se Byung Chae, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/661,883

(22) Filed: May 13, 2024

(65) Prior Publication Data

US 2024/0296788 A1 Sep. 5, 2024

Related U.S. Application Data

(63) Continuation of application No. 17/975,006, filed on Oct. 27, 2022, now Pat. No. 12,020,629.

(30) Foreign Application Priority Data

Nov. 2, 2021 (KR) ........................ 10-2021-0148795

(51) Int. Cl.
*G09G 3/32* (2016.01)

(52) U.S. Cl.
CPC ......... *G09G 3/32* (2013.01); *G09G 2310/027* (2013.01); *G09G 2310/0278* (2013.01); *G09G 2320/0276* (2013.01)

(58) Field of Classification Search
CPC ............... G09G 3/32; G09G 2310/027; G09G 2310/0278; G09G 2320/0276
See application file for complete search history.

(56) References Cited

U.S. PATENT DOCUMENTS

| | | | | |
|---|---|---|---|---|
| 8,970,787 | B2 | 3/2015 | Jung et al. | |
| 11,189,233 | B2 | 11/2021 | Son et al. | |
| 2012/0056918 | A1* | 3/2012 | Nonaka | G09G 3/342 345/694 |

(Continued)

FOREIGN PATENT DOCUMENTS

| | | |
|---|---|---|
| KR | 10-0844142 | 7/2008 |
| KR | 10-2021-0004007 | 1/2021 |

*Primary Examiner* — Ke Xiao
*Assistant Examiner* — Jennifer L Zubajlo
(74) *Attorney, Agent, or Firm* — F. CHAU & ASSOCIATES, LLC

(57) ABSTRACT

A display device including: a display panel; a scan driver; and a data driver, wherein the data driver includes: a controller configured to generate a gamma voltage control signal with respect to gamma voltage information corresponding to a target luminance level of an image displayed by the display panel; a gamma voltage generator configured to generate gamma voltages having a voltage range corresponding to the target luminance level based on the gamma voltage control signal; and a decoder configured to generate the data signal corresponding to a grayscale value using the gamma voltages, and wherein the controller calculates an offset value corresponding to the target luminance level and applies the offset value to values obtained using gamma voltage information about sample luminance levels to obtain gamma voltage information corresponding to the target luminance level.

9 Claims, 11 Drawing Sheets

(56) References Cited

U.S. PATENT DOCUMENTS

| | | | | |
|---|---|---|---|---|
| 2020/0286448 | A1* | 9/2020 | Kim | G09G 5/18 |
| 2020/0335042 | A1* | 10/2020 | Son | G09G 3/3291 |
| 2021/0012705 | A1* | 1/2021 | Pyun | G09G 3/32 |
| 2022/0076629 | A1* | 3/2022 | Yang | G09G 3/3696 |
| 2023/0139147 | A1 | 5/2023 | Chae | |

* cited by examiner

<Table 1>

| | DBV[1] | DBV[2] | DBV[3] | ··· | DBV[K] | DBV[K+1] | ··· | DBV[N] |
|---|---|---|---|---|---|---|---|---|
| 0 | a1 | a2 | a3 | ··· | a4 | a5 | ··· | a6 |
| 40 | a7 | a8 | a9 | ··· | a10 | a11 | ··· | a12 |
| 80 | a13 | a14 | a15 | ··· | a16 | a17 | ··· | a18 |
| 120 | a19 | a20 | a21 | ··· | a22 | a23 | ··· | a24 |
| 160 | a25 | a26 | a27 | ··· | a28 | a29 | ··· | a30 |
| 200 | a31 | a32 | a33 | ··· | a34 | a35 | ··· | a36 |
| 255 | a37 | a38 | a39 | ··· | a40 | a41 | ··· | a42 |

FIG. 11C

<Table 2>

| | DBV[1] | DBV[2] | DBV[3] | ··· | DBV[K] | DBV[K+1] | ··· | DBV[N] |
|---|---|---|---|---|---|---|---|---|
| 0 | b1 | b2 | b3 | ··· | b4 | b5 | ··· | b6 |
| 40 | b7 | b8 | b9 | ··· | b10 | b11 | ··· | b12 |
| 80 | b13 | b14 | b15 | ··· | b16 | b17 | ··· | b18 |
| 120 | b19 | b20 | b21 | ··· | b22 | b23 | ··· | b24 |
| 160 | b25 | b26 | b27 | ··· | b28 | b29 | ··· | b30 |
| 200 | b31 | b32 | b33 | ··· | b34 | b35 | ··· | b36 |
| 255 | b37 | b38 | b39 | ··· | b40 | b41 | ··· | b42 |

DISPLAY DEVICE

CROSS-REFERENCE TO RELATED APPLICATIONS

This application is a continuation of U.S. patent application Ser. No. 17/975,006 filed on Oct. 27, 2022, which claims priority under 35 U.S.C. § 119 to Korean Patent Application No. 10-2021-0148795 filed in the Korean Intellectual Property Office on Nov. 2, 2021, the disclosures of which are incorporated by reference herein in their entireties.

1. Technical Field

The present invention relates to a display device.

2. Description of the Related Art

A display device is an output device for presentation of information in visual form. Common applications for electronic visual displays are televisions, computer monitors and smartphones. Display devices each include a display panel and a driver. The display panel includes scan lines, data lines, and pixels connected to the scan lines and the data lines. The driver includes a scan driver which sequentially provides scan signals to the scan lines and a data driver which provides data signals to the data lines. Each of the pixels may emit light at a luminance corresponding to a data signal provided through a corresponding data line in response to a scan signal provided through a corresponding scan line.

The data driver may generate gamma voltages corresponding to a plurality of grayscale values and convert grayscale values of image data into data signals using the gamma voltages.

SUMMARY OF THE INVENTION

The present invention provides a display device capable of displaying an image at a luminance corresponding to a target luminance level.

A display device according to embodiments of the present invention includes a display panel including scan lines, data lines, and pixels connected to the scan lines and the data lines; a scan driver configured to provide a scan signal to one of the scan lines; and a data driver configured to generate a data signal based on image data and provide the data signal to one of the data lines, wherein the data driver includes: a controller configured to generate a gamma voltage control signal with respect to gamma voltage information corresponding to a target luminance level of an image displayed by the display panel; a gamma voltage generator configured to generate gamma voltages having a voltage range corresponding to the target luminance level based on the gamma voltage control signal; and a decoder configured to generate the data signal corresponding to a grayscale value using the gamma voltages, and wherein the controller calculates an offset value corresponding to the target luminance level and applies the offset value to values obtained using gamma voltage information about sample luminance levels to obtain gamma voltage information corresponding to the target luminance level.

The controller includes: a gamma voltage controller configured to calculate the gamma voltage information corresponding to the target luminance level using a first look-up table; and an offset circuit configured to calculate the offset value, and wherein the gamma voltage information about the sample luminance levels is pre-stored in the first look-up table.

When the target luminance level is different from the sample luminance levels, the gamma voltage controller calculates the gamma voltage information corresponding to the target luminance level by applying the offset value to values calculated by applying a linear interpolation method to the gamma voltage information about the sample luminance levels.

The offset circuit calculates the offset value using values of a first sample luminance level and a second sample luminance level among the sample luminance levels and a value of the target luminance level.

The first sample luminance level and the second sample luminance level correspond to two sample luminance levels that have the smallest difference from the target luminance level among the sample luminance levels.

The offset circuit calculates the offset value using Equation 1 below:

$$OS = a \times \left[DV - \left(\frac{DBV1 + DBV2}{2}\right)\right]^{\frac{1}{b}}, \quad \text{[Equation 1]}$$

wherein, in Equation 1, OS denotes the offset value, DV denotes the target luminance level, DBV1 and DBV2 denote the first sample luminance level and the second sample luminance level, and a and b are proportional constants according to emission characteristics of the pixel.

When the target luminance level is one of the sample luminance levels, the gamma voltage controller calculates target gamma voltage information, which corresponds to a sample luminance level equal to the target luminance level among the gamma voltage information stored in the first look-up table, as gamma voltage information about the target luminance level.

The gamma voltage generator includes: a first resistor string configured to set the voltage range of the gamma voltages; gamma buffers configured to output some voltages divided within the voltage range; a second resistor string which includes tabs connected to output terminals of the gamma buffers and divides a voltage between the taps to generate the gamma voltages; a first buffer configured to apply a maximum gamma voltage to a first end of the first resistor string; and a second buffer configured to apply a minimum gamma voltage to a second end of the first resistor string, and wherein the maximum gamma voltage of the first buffer or the minimum gamma voltage of the second buffer is changed according to the target luminance level.

The controller further includes a data converter configured to generate a corrected digital input value by correcting a digital input value of the image data, and wherein the decoder generates the data signal by selecting a gamma voltage corresponding to the corrected digital input value among the gamma voltages.

The data converter generates the corrected digital input value using a second look-up table, and wherein corrected digital input values with respect to the sample luminance levels are pre-stored in the second look-up table.

When the target luminance level is one of the sample luminance levels, the data converter calculates a corrected digital input value, which corresponds to a sample luminance level equal to the target luminance level among the corrected digital input values stored in the second look-up table, as a corrected digital input value of the target luminance level.

When the target luminance level is different from the sample luminance levels, the data converter calculates a value, which is calculated by applying a linear interpolation method to the corrected digital input values with respect to the sample luminance levels, as a corrected digital input value of the target luminance level.

A display device according to embodiments of the present invention includes a display panel including scan lines, data lines, and pixels connected to the scan lines and the data lines; a scan driver configured to provide a scan signal to one of the scan lines; and a data driver configured to generate a data signal based on image data and provide the data signal to one of the data lines, wherein the data driver includes: a controller configured to generate a corrected digital input value corresponding to a target luminance level of an image displayed by the display panel by correcting a digital input value of the image data; a gamma voltage generator configured to generate gamma voltages; and a decoder configured to generate the data signal by selecting a gamma voltage corresponding to the corrected digital input value among the gamma voltages, and wherein the controller calculates an offset value corresponding to the target luminance level and applies the offset value to values obtained using corrected digital input values with respect to sample luminance levels to calculate the corrected digital input value corresponding to the target luminance level.

The controller includes: a data converter configured to calculate the corrected digital input value corresponding to the target luminance level using a second look-up table; and an offset circuit configured to calculate the offset value, and wherein the corrected digital input values with respect to the sample luminance levels are pre-stored in the second look-up table.

When the target luminance level is different from the sample luminance levels, the data converter applies the offset value to values, which are calculated by applying a linear interpolation method to the corrected digital input values with respect to the sample luminance levels, to calculate the corrected digital input value corresponding to the target luminance level.

The offset circuit calculates the offset value using values of a first sample luminance level and a second sample luminance level among the sample luminance levels and a value of the target luminance level.

The first sample luminance level and the second sample luminance level correspond to two sample luminance levels that have the smallest difference from the target luminance level among the sample luminance levels.

The offset circuit calculates the offset value using Equation 1 below:

$$OS = a \times \left[DV - \left(\frac{DBV1 + DBV2}{2}\right)\right]^{\frac{1}{b}}, \quad \text{[Equation 1]}$$

wherein, in Equation 1, OS denotes the offset value, DV denotes the target luminance level, DBV1 and DBV2 denote the first sample luminance level and the second sample luminance level, and a and b are proportional constants according to emission characteristics of the pixel.

When the target luminance level is one of the sample luminance levels, the data converter calculates a corrected digital input value, which corresponds to a sample luminance level equal to the target luminance level among the corrected digital input values stored in the second look-up table, as the corrected digital input value of the target luminance level.

The controller further includes a gamma voltage controller configured to generate a gamma voltage control signal in response to the target luminance level, and wherein the gamma voltage generator changes an entire voltage range of the gamma voltages based on the gamma voltage control signal.

BRIEF DESCRIPTION OF THE DRAWINGS

FIGS. 11A, 11B and 11C are diagrams for describing an operation of the offset circuit included in the controller of FIG. 7.

DETAILED DESCRIPTION OF THE EMBODIMENTS

Figure 1:
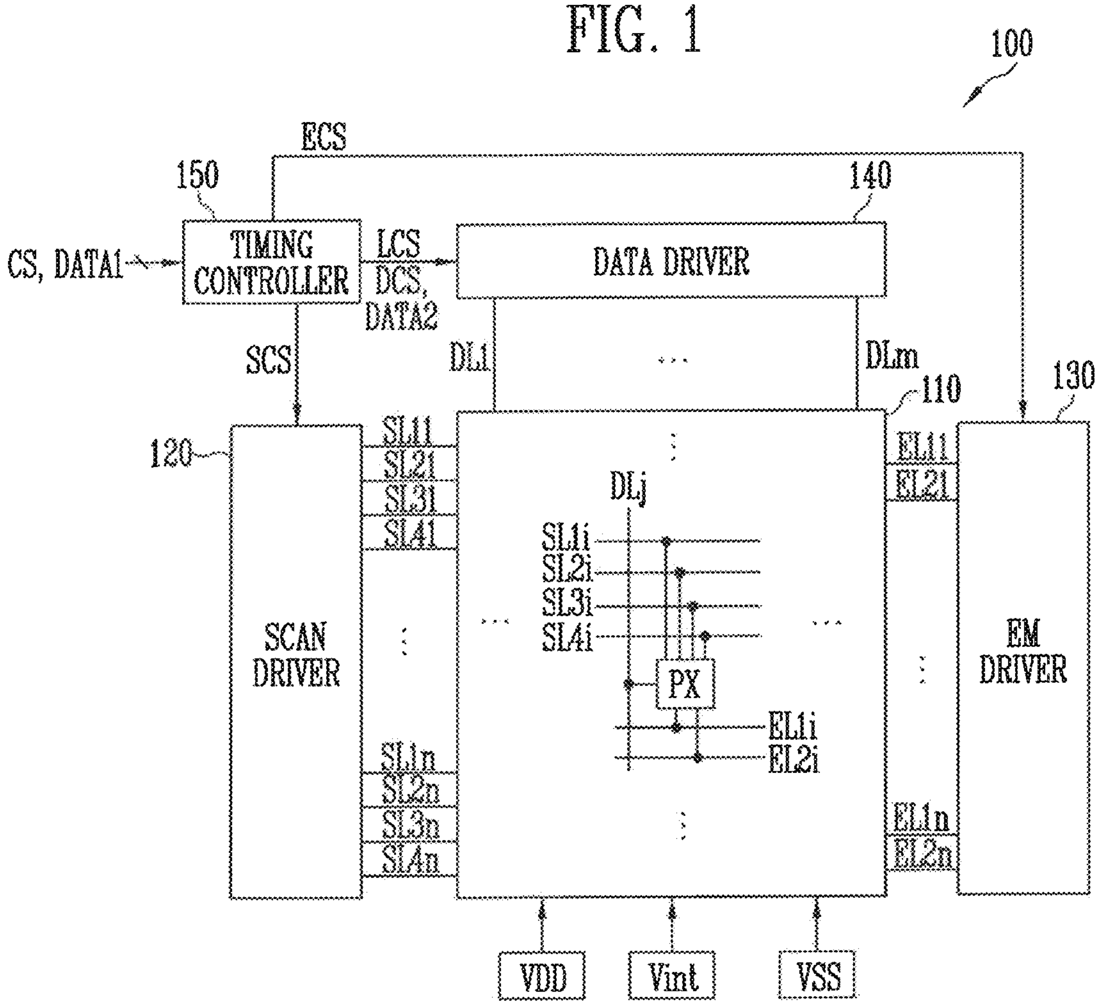
FIG. 1 is a block diagram illustrating a display device according to embodiments of the present invention.

Hereinafter, embodiments of the present invention will be described in more detail with reference to the accompanying drawings. Like reference numerals may be used to indicate like elements throughout the drawings, and thus, the same descriptions for the like elements may be omitted.

FIG. 1 is a block diagram illustrating a display device according to embodiments of the present invention.

Referring to FIG. 1, a display device 100 may include a display unit 110 (or a display panel), a scan driver 120, an emission driver 130, a data driver 140, and a timing controller 150.

The display unit 110 may include scan lines SL11 to SL1*n*, SL21 to SL2*n*, SL31 to SL3*n*, and SL41 to SL4*n*, emission control lines EL11 to EL1*n* and EL21 to EL2*n*, data lines DL1 to DLm, and pixels PX connected thereto (wherein m and n are an integer greater than 1). Each of the pixels PX may include a driving transistor and a plurality of switching transistors.

According to embodiments of the present invention, the display device 100 may further include a power supply. The power supply may supply a first power voltage VDD, a second power voltage VSS, and a third power voltage Vint (or an initialization voltage) for driving the pixel PX to the display unit 110. The first and second power voltages VDD and VSS may be different from each other in voltage magnitude.

The timing controller 150 may receive first data DATA1 (or input image data) and a control signal CS from an external device (for example, a graphic processor). The timing controller 150 may control driving timings of the scan driver 120, the emission driver 130, and the data driver 140.

The timing controller 150 may generate a scan control signal SCS, an emission control signal ECS, and a data control signal DCS based on the control signal CS. The scan control signal SCS may be supplied to the scan driver 120, the emission control signal ECS may be supplied to the emission driver 130, and the data control signal DCS may be supplied to the data driver 140. The timing controller 150 may convert the first data DATA1 to generate second data DATA2 (or image data) and may supply the second data DATA2 to the data driver 400.

In an embodiment of the present invention, the timing controller 150 may generate a luminance control signal LCS based on the control signal CS and may supply the luminance control signal LCS to the data driver 400. Here, the luminance control signal LCS may include information about a target luminance level of an image displayed by the display unit 110.

The scan driver 120 may receive the scan control signal SCS from the timing controller 150. Based on the scan control signal SCS, the scan driver 120 may supply a first scan signal, a second scan signal, a third scan signal, and a fourth scan signal to first scan lines SL11 to SL1*n*, second scan lines SL21 to SL2*n*, third scan lines SL31 to SL3*n*, and fourth scan lines SL41 to SL4*n*, respectively.

The first to fourth scan signals may be set to have a gate-on level voltage corresponding to a type of a transistor to which a corresponding scan signal is supplied. A transistor receiving a scan signal may be set to a turn-on state when the scan signal is supplied.

The emission driver 130 may supply a first emission control signal and a second emission control signal to first emission control lines EL11 to EL1*n* and second emission control lines EL21 to EL2*n* based on the emission control signal ECS, respectively.

The first and second emission control signals may be set to a gate-off level voltage corresponding to a type of a transistor to which a corresponding emission control signal is supplied. A transistor receiving the first emission control signal or the second emission control signal may be turned off when the first emission control signal or the second emission control signal is supplied and may be set to a turned-on state in other cases.

In FIG. 1, each of the scan driver 120 and the emission driver 130 is illustrated as being a single component for convenience of description, but the present invention is not limited thereto. For example, the scan driver 120 may include a plurality of scan drivers each supplying at least one of the first to fourth scan signals. For example, a first scan driver for supplying the first scan signals, a second scan driver for supplying the second scan signals, and so forth. In addition, at least a part of the scan driver 120 and the emission driver 130 may be integrated into one driving circuit, module, or the like.

The data driver 140 may receive the data control signal DCS and the second data DATA2 from the timing controller 150. The data driver 140 may generate data signals (or data voltages) based on the data control signal DCS and the second data DATA2 and may supply the data signals to the data lines DL1 to DLm. In this case, the data signal supplied to the data lines DL1 to DLm may be synchronized with an output timing of the first scan signal supplied to the first scan lines SL11 to SL1*n*. Here, the data control signal DCS may be a signal that controls an operation of the data driver 140 and may include a load signal (or a data enable signal) for instructing the output of a valid data signal.

According to embodiments of the present invention, the data driver 140 may generate gamma voltages. Here, the gamma voltages may be used to convert the second data DATA2 in a digital format into a data signal (or a data voltage) in an analog format. For example, the data driver 140 may output a data signal (or a data voltage) by selecting a gamma voltage corresponding to a grayscale value in the second data DATA2 from among the gamma voltages.

According to embodiments of the present invention, the data driver 140 may change an entire voltage range of the gamma voltages to adjust a level of an output data signal according to a target luminance level of an image displayed by the display unit 110. For example, the data driver 140 may change the entire voltage range of the gamma voltages using a look-up table (LUT) (or a first look-up table) in which gamma voltage information corresponding to a luminance level is pre-stored.

Here, when gamma voltage information about all luminance levels is stored in the first look-up table, since an amount of data to be stored in the first look-up table may be very large, only gamma voltage information about sample luminance levels, which are some of the luminance levels, is stored in the first look-up table. In this case, the data driver 140 uses the gamma voltage information about the sample luminance levels for some of the luminance levels, and may obtain gamma voltage information about the remaining luminance levels through interpolation using the gamma voltage information about the sample luminance levels. In other words, first gamma voltage information for a first portion of the luminance levels is obtained directly from the first look-up table, and second gamma voltage information for a second portion of the luminance levels is obtained through interpolation using the gamma voltage information in the first look-up table.

The gamma voltages may include a number of gamma voltages corresponding to a digital input value (or a gamma code) of a specific bit (for example, 10-bit or 11-bit). Here, the gamma voltages generated by the data driver 140 may be linear with respect to the above-described digital input value. For example, the gamma voltages may correspond to values positioned on a straight line corresponding to a linear equation for the digital input value.

However, when a data signal output in response to a grayscale value is linear with respect to the grayscale value (in other words, directly proportional thereto), the visibility of a display image is lowered. Thus, the data driver 140 may perform correction (for example, gamma correction) on an digital input value (or gamma code) of the second data DATA2 such that a gamma voltage selected in response to a grayscale value, in other words, a data signal (or data voltage), is non-linear with respect to the grayscale value, thereby calculating a corrected digital input value. For example, among the gamma voltages, a gamma voltage selected in response to a corrected digital input value, in other words, a data signal (or data voltage), may correspond to values positioned on a gamma curve (for example, a 2.2 gamma curve) for a grayscale value.

Here, since the gamma curve is different according to a luminance level of an image displayed by the display unit 110, the data driver 140 may calculate a corrected digital input value to correspond to a target luminance level of a display image. For example, the data driver 140 may calculate a corrected digital input value using an look-up table (or a second look-up table) in which a corrected digital input value corresponding to a luminance level is pre-stored for each grayscale value.

In addition, similarly as described with reference to the first look-up table, when corrected digital input values with respect to all luminance levels are stored in the second look-up table for each grayscale value, an amount of data to be stored in the second look-up table may be very large. Thus, only corrected digital input values with respect to sample luminance levels among luminance levels may be stored in the second look-up table for each grayscale value. In this case, the data driver 140 may obtain corrected digital input values with respect to the remaining luminance levels through interpolation using the corrected digital input values for the sample luminance levels.

As will be described below with reference to FIG. 2, since a relationship between a voltage level of a data signal applied to the pixel PX and a driving current flowing in a light-emitting element in the pixel PX is not linear, when the data driver 140 does not consider emission characteristics of the pixel PX, an actual luminance level of a display image may be different from a target luminance level.

For example, in a case in which the data driver 140 changes a voltage range of gamma voltages according to a target luminance level, when the data driver 140 simply performs linear interpolation on gamma voltage information about sample luminance levels to obtain gamma voltage information about the remaining luminance levels, since a voltage level of a data signal (or data voltage) generated by being selected as one of the gamma voltages is also changed linearly with respect to a luminance level, a luminance level of light emitted by the light-emitting element in the pixel PX in response to a driving current may be different from a target luminance level.

Accordingly, for the remaining luminance levels except for the sample luminance levels, the data driver 140 (or the display device 100) according to embodiments of the present invention may calculate an offset value corresponding to a target luminance level of a display image in consideration of emission characteristics of the pixel PX. In addition, the data driver 140 may calculate gamma voltage information about the target luminance level of the display image by applying the offset value to a value obtained by performing an interpolation (for example, linear interpolation) on gamma voltage information about the sample luminance levels stored in the first look-up table. In addition, the data driver 140 may set the entire voltage range of the gamma voltages corresponding to the target luminance level using the calculated gamma voltage information. Accordingly, the display device 100 may display an image at a luminance corresponding to a target luminance through the display unit 110. This will be described in detail later with reference to FIGS. 7, 8, 10, and 11A to 11C.

However, embodiments of the present invention are not limited thereto, and the data driver 140 (or the display device 100) according to embodiments of the present invention may calculate an offset value for a corrected digital input value.

For example, for the remaining luminance levels except for the sample luminance levels, the data driver 140 (or the display device 100) according to embodiments of the present invention may calculate an offset value corresponding to a target luminance level of a display image in consideration of emission characteristics of the pixel PX. In addition, the data driver 140 may calculate a corrected digital input value with respect to the target luminance level of the display image by applying an offset value to a value obtained by performing an interpolation (for example, linear interpolation) on a corrected digital input value of the sample luminance levels stored in the second look-up table. Accordingly, the display device 100 may display an image at a luminance corresponding to a target luminance through the display unit 110. This will be described in detail later with reference to FIGS. 12 and 13.

Figure 2:
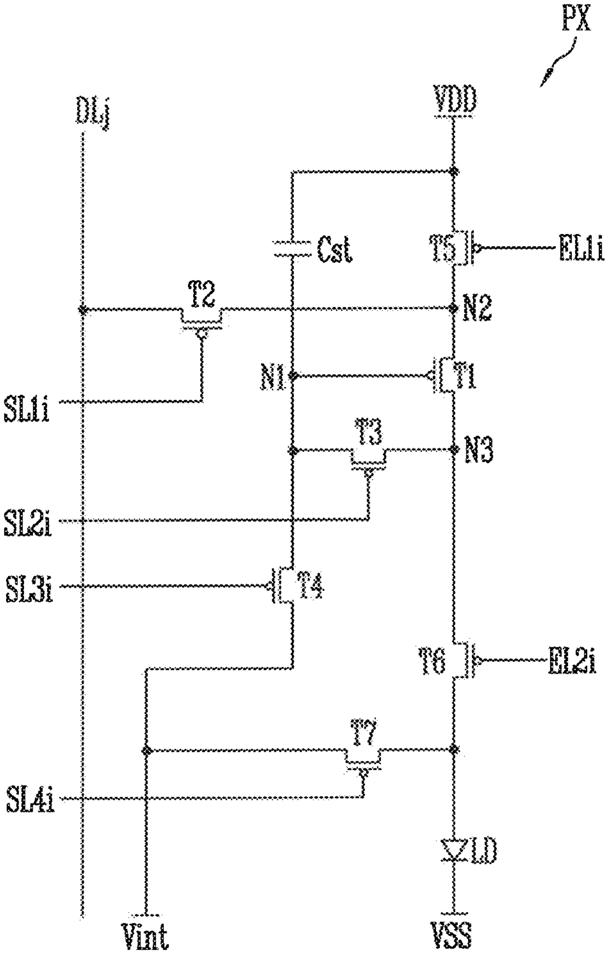
FIG. 2 is a circuit diagram illustrating an example of a pixel included in the display device of FIG. 1.

FIG. 2 is a circuit diagram illustrating an example of a pixel included in the display device of FIG. 1.

For convenience of description, FIG. 2 illustrates a pixel PX positioned on an $i^{th}$ horizontal line (or an $i^{th}$ pixel row) and connected to a $j^{th}$ data line DLj (wherein i and j are a natural number).

Referring to FIGS. 1 and 2, the pixel PX may include first, second, third, fourth, fifth, sixth and seventh transistors T1, T2, T3, T4, T5, T6 and T7, a storage capacitor Cst, and a light-emitting element LD.

Each of the first to seventh transistors T1 to T7 may be implemented as a p-type transistor, but the present invention is not limited thereto. For example, at least some of the first to seventh transistors T1 to T7 may be implemented as an n-type transistor.

A first electrode of a first transistor T1 (a driving transistor) may be connected to a second node N2, and a second electrode of the first transistor T1 may be connected to a third node N3. A gate electrode of the first transistor T1 may be connected to a first node N1. The first transistor T1 controls a driving current flowing from a first power line for supplying a first power voltage VDD to a second power line for supplying a second power voltage VSS through the light-emitting element LD in response to a voltage of the first node N1.

Here, as described with reference to FIG. 1, a relationship between the driving current and a voltage level of a data signal applied to the pixel PX through the j-th data line DLj is not linear. For example, as shown below, the driving current may be proportional to the square of a difference between a source-gate voltage and a threshold voltage of the first transistor T1.

Here, k may denote a proportional constant determined by a structure and physical characteristics of the first transistor T1, Vsg may denote a source-gate voltage of the first transistor T1, and Vth may denote a threshold voltage of the first transistor T1.

The first power voltage VDD may be set to be higher than the second power voltage VSS. As an example, the first power voltage VDD may be a positive voltage, and the second power voltage VSS may be a negative voltage.

The second transistor T2 may be connected between the $j^{th}$ data line DLj (hereinafter, referred to as a data line) and the second node N2. A gate electrode of the second transistor T2 may be connected to an $i^{th}$-first scan line SL1*i* (hereinafter, referred to as a first scan line). When a first scan signal is supplied to the first scan line SL1*i*, the second transistor T2 may be turned on to electrically connect the data line DLj and the second node N2.

The third transistor T3 may be connected between the second electrode of the first transistor T1 (or the third node N3) and the gate electrode of the first transistor T1 (or the first node N1). A gate electrode of the third transistor T3 may be connected to an $i^{th}$-second scan line SL2*i* (hereinafter, referred to as a second scan line).

When a second scan signal is supplied to the second scan line SL2*i*, the third transistor T3 may be turned on to electrically connect the second electrode and the gate electrode of the first transistor T1 (or the first node N1) and the third node N3. In other words, a timing at which the second electrode (for example, a drain electrode) of the first transistor T1 and the gate electrode of the first transistor T1 are connected may be controlled by the supply of the second scan signal. When the third transistor T3 is turned on, the first transistor T1 may be connected in the form of a diode.

Although the first scan line SL1*i* and the second scan line SL2*i* are illustrated as separate scan lines in FIG. 2, the present invention is not limited thereto. For example, a pulse width of the second scan signal supplied to the second scan line SL2*i* may be the same as a pulse width of the first scan signal supplied to the first scan line SL1*i*. For example, the first scan signal supplied to the same pixel PX may be a signal in which the second scan signal is shifted. For example, a first scan line (for example, S1*i*) connected to the $i^{th}$ pixel row may be connected to a second scan line (for example, S2*i*+k) connected to a $(i+k)^{th}$ pixel row (wherein k is a non-zero integer).

The fourth transistor T4 may be connected between the first node N1 and a third power line for supplying a third power voltage Vint (for example, an initialization voltage). A gate electrode of the fourth transistor T4 may be connected to an $i^{th}$-third scan line SL3*i* (hereinafter, referred to as a third scan line).

When a third scan signal is supplied to the third scan line SL3*i*, the fourth transistor T4 may be turned on to supply the third power voltage Vint to the first node N1. For example, the third power voltage Vint may be set to a voltage that is lower than a lowest level of a data signal supplied to the data line DLj.

The fourth transistor T4 may be turned on by the supply of the third scan signal so that the first node N1 (or the gate electrode of the first transistor T1) may be initialized to the third power voltage Vint.

The fifth transistor T5 may be connected between the first power line for supplying the first power voltage VDD and the second node N2. A gate electrode of the fifth transistor T5 may be connected to an $i^{th}$-first emission control line EL1*i* (hereinafter, referred to as a first emission control line).

The fifth transistor T5 may be turned off when a first emission control signal is supplied to the first emission control line EL1*i* and may be turned on in other cases. When the fifth transistor T5 is turned on, the second node N2 may be electrically connected to the first power line through which the first power voltage VDD is provided.

The sixth transistor T6 may be connected between the third node N3 and a first electrode (for example, an anode) of the-light emitting element LD. A gate electrode of the sixth transistor T6 may be connected to an $i^{th}$-second emission control line EL2*i* (hereinafter, referred to as a second emission control line).

The sixth transistor T6 may be turned off when a second emission control signal is supplied to the second emission control line EL2*i* and may be turned on in other cases. When the sixth transistor T6 is turned on, the third node N3 and the first electrode of the light-emitting element LD may be electrically connected.

Although the first emission control line EL1*i* and the second emission control line EL2*i* are illustrated as separate emission control lines in FIG. 2, the present invention is not limited thereto. For example, the first emission control signal supplied to the first emission control line EL1*i* and the second emission control signal supplied to the second emission control line EL2*i* may be the same signal. For example, the first emission control line EL1*i* and the second emission control line EL2*i* connected to the $i^{th}$ pixel row may be the same line.

The seventh transistor T7 may be connected between the first electrode of the light-emitting element LD and the third power line for supplying the third power voltage Vint. A gate electrode of the seventh transistor T7 may be connected to an $i^{th}$-fourth scan line SL4*i* (hereinafter, referred to as a fourth scan line).

When a fourth scan signal is supplied to the fourth scan line SL4*i*, the seventh transistor T7 may be turned on to supply the third power voltage Vint to the first electrode (for example, the anode) of the light-emitting element LD.

When the third power voltage Vint is supplied to the first electrode of the light-emitting element LD by the supply of the fourth scan signal, a parasitic capacitor of the light-emitting element LD may be discharged. In this case, as a residual voltage charged in the parasitic capacitor is discharged (e.g., removed), and unintentional fine light emission can be prevented. Accordingly, the black expression ability of the pixel PX may be improved.

Both the fourth transistor T4 and the seventh transistor T7 are illustrated in FIG. 2 as being connected to the third power line for supplying the third power voltage Vint, but this is merely an example, and embodiments of the present invention are not limited thereto. For example, the fourth transistor T4 and the seventh transistor T7 may be respectively connected to power lines for supplying different power voltages. For example, a voltage for initializing the first node N1 and a voltage for initializing the first electrode of the light-emitting element LD may be different.

The storage capacitor Cst may be connected between the first power line for supplying the first power voltage VDD and the first node N1. For example, the storage capacitor Cst may be connected to the gate electrode of the first transistor T1. The storage capacitor Cst may store a voltage corresponding to a data signal and a threshold voltage of the first transistor T1.

The first electrode (for example, the anode) of the light-emitting element LD may be connected to a second electrode of the sixth transistor T6, and a second electrode (for example, a cathode) of the light emitting element LD may be connected to the second power line for transmitting the second power voltage VSS. The light-emitting element LD may generate light at a predetermined luminance in response to an amount of a current supplied from the first transistor T1.

As described above, when the driving transistor (in other words, the first transistor T1) is implemented as a p-type transistor, when a voltage level of a data signal (or a data voltage) supplied through the data line DLj is decreased, an amount of a driving current flowing to the-light emitting element LD is increased. Thus, a luminance level of light emitted by the light-emitting element LD may also be increased.

In an embodiment of the present invention, the light-emitting element LD may be an organic light-emitting diode including an organic light-emitting layer. In another embodiment of the present invention, the light-emitting element LD may be an inorganic light-emitting diode made of an inorganic material, such as a micro light-emitting diode (LED) or a quantum dot LED. In still another embodiment of the present invention, the light-emitting element LD may be a light-emitting element including an organic material and an inorganic material in combination.

In FIG. 2, the pixel PX is illustrated to include the single light-emitting element LD, but in other embodiments, the pixel PX may include a plurality of light-emitting elements. The plurality of light-emitting elements may be connected in series, in parallel, or in series and parallel. For example, the light-emitting element LD may have a form in which a plurality of light-emitting elements (for example, organic light-emitting elements and/or inorganic light-emitting elements) are connected in series, in parallel, or in series and parallel.

A pixel circuit structure included in the display device 100 according to embodiments of the present invention is not limited to the shape and structure of the pixel PX shown in FIG. 2, and the structure of the pixel PX may be variously changed. As an example, the pixel PX may further include other circuit elements such as various transistors and capacitors. As another example, the pixel PX may be implemented in a circuit structure in which some of the components described with reference to FIG. 2 are omitted.

Figure 3:
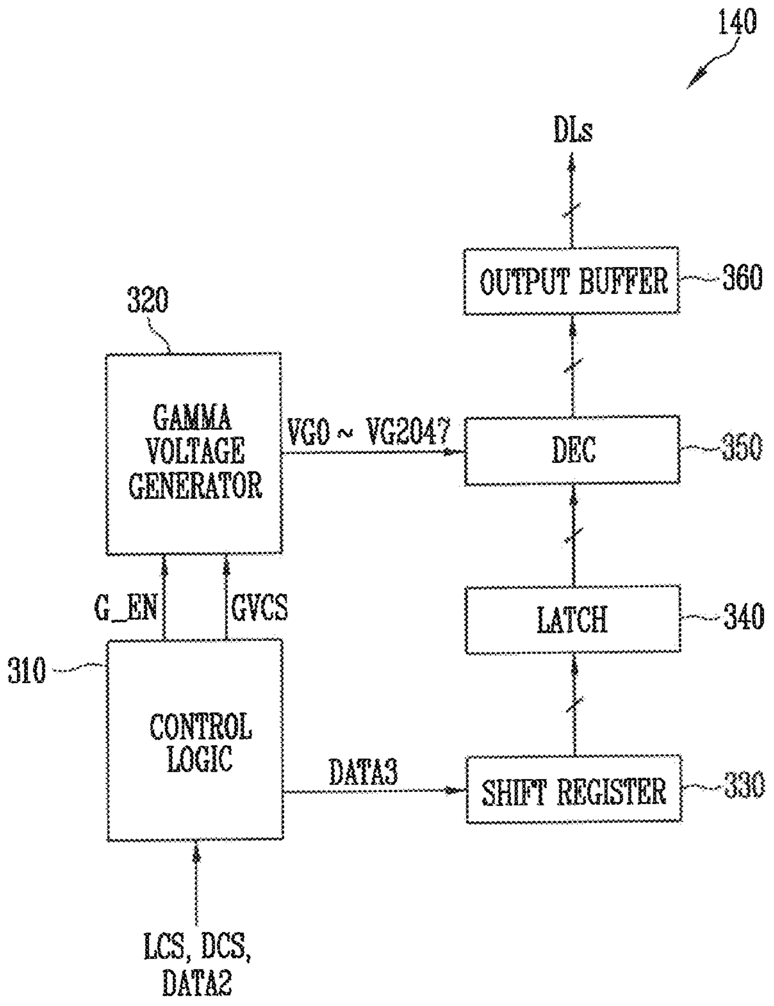
FIG. 3 is a block diagram illustrating an example of a data driver included in the display device of FIG. 1.
Figure 4:
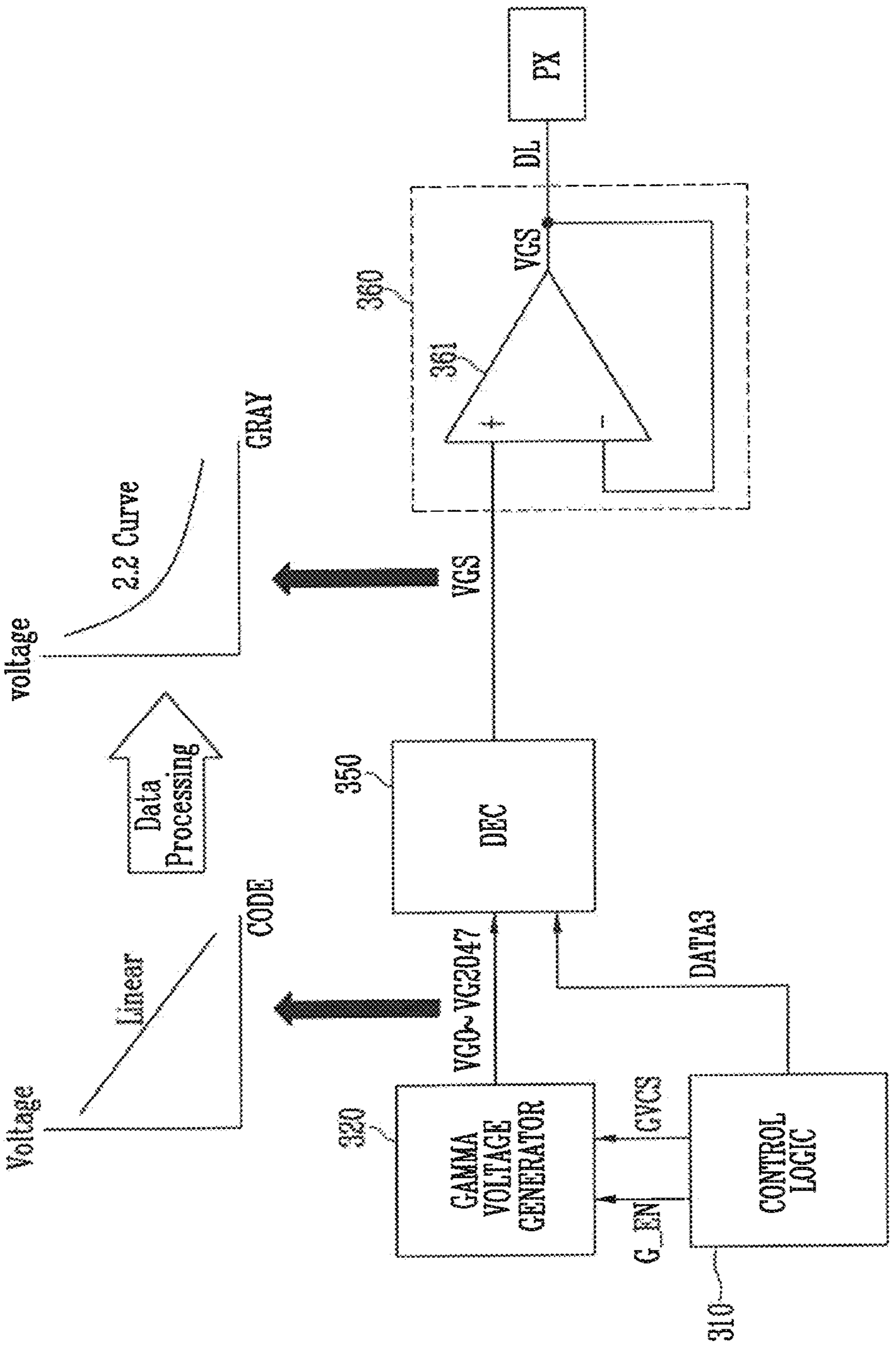
FIG. 4 is a block diagram illustrating an example of the data driver of FIG. 3.

FIG. 3 is a block diagram illustrating an example of a data driver included in the display device of FIG. 1. FIG. 4 is a block diagram illustrating an example of the data driver of FIG. 3. In FIG. 4, for convenience of description, a data driver 140 is briefly illustrated based on a controller 310, a gamma voltage generator 320, a decoder 350, and an output buffer 360 which are necessary for driving one pixel PX.

Referring to FIGS. 1, 3, and 4, the data driver 140 may include the controller 310 (or a control circuit or control logic), the gamma voltage generator 320 (or a gamma voltage generation circuit), a shift register 330, a latch 340, the decoder 350 (or a digital-to-analog converter (DAC)), and the output buffer 360.

The controller 310 may receive a luminance control signal LCS, a data control signal DCS, and second data DATA2 from a timing controller 150.

The controller 310 may generate a gamma enable signal G_EN based on the data control signal DCS and the second data DATA2 and may provide the gamma enable signal G_EN to the gamma voltage generator 320. The gamma enable signal G_EN may control the gamma voltage generator 320 such that the gamma voltage generator 320 generates gamma voltages VG0 to VG2047. Here, the gamma voltages VG0 to VG2047 may be used to generate a data signal VGS (or a data voltage) corresponding to a grayscale value in the second data DATA2. The gamma voltages VG0 to V2047 may include 2,048 gamma voltages corresponding to 11-bit data, but this is merely an example, and the present invention is not limited thereto. For example, the gamma voltages may include the number of gamma voltages corresponding to 10-bit or less data (for example, the number of gamma voltages VG0 to VG1023 corresponding to 10-bit data) or may include the number of gamma voltages corresponding to 12-bit or more data (for example, the number of gamma voltages VG0 to VG4097 corresponding to 12-bit data).

In an embodiment of the present invention, the controller 310 may generate a gamma voltage control signal GVCS based on the luminance control signal LCS and may provide the gamma voltage control signal GVCS to the gamma voltage generator 320. According to a target luminance level of a display image, the gamma voltage control signal GVCS may control the gamma voltage generator 320 to change an entire voltage range of the gamma voltages generated by the gamma voltage generator 320. For example, as described with reference to FIG. 1, the controller 310 may change the entire voltage range of the gamma voltages using a look-up table (or a first look-up table) in which gamma voltage information about sample luminance levels is stored.

In an embodiment of the present invention, the controller 310 may change the serialized second data DATA2 (or image data) received from the timing controller 150 into parallelized third data DATA3 (or corrected image data) and may supply the third data DATA3 to the shift register 330. Here, as described with reference to FIG. 1, the controller 310 may calculate a corrected digital input value by correcting a digital input value (or a gamma code) of the second data DATA2 such that a gamma voltage selected in response to a grayscale value, in other words, a data signal VGS, is non-linear with respect to the grayscale value, thereby converting the second data DATA2 into the third data DATA3. Here, the third data DATA3 may include the corrected digital input value.

In addition, the controller 310 may calculate an offset value based on the luminance control signal LCS. Here, as described with reference to FIG. 1, the controller 310 may use an offset value to calculate gamma voltage information about a target luminance level to generate the gamma voltage control signal GVCS or may use the offset value to calculate a corrected digital input value corresponding to the target luminance level. Such an operation of the controller 310 will be described in detail later with reference to FIGS. 7 to 13.

The gamma voltage generator 320 may receive the gamma enable signal G_EN to generate the gamma voltages VG0 to VG2047 having various voltage levels.

In embodiments of the present invention, the gamma voltage generator 320 may include resistor strings and gamma buffers which transmit representative gamma voltages to taps of the resistor strings.

In an embodiment of the present invention, the gamma voltage generator 320 may be a digital gamma voltage generator. In this case, gamma voltages output from the gamma voltage generator 320 may be linear. For example, as shown in FIG. 4, the gamma voltages VG0 to VG2047 output from the gamma voltage generator 320 to the decoder 350 may correspond to values positioned on a straight line corresponding to a linear equation for a digital input value (or a gamma code CODE).

In addition, as described above, the gamma voltage generator 320 may change the entire voltage range of the gamma voltages based on the gamma voltage control signal GVCS.

The shift register 330 may supply the third data DATA3 to the latch 340. The shift register 330 may generate and supply a latch clock signal to the latch 340, and the latch clock signal may be used to control a timing at which the parallelized third data DATA3 is output.

The latch 340 may latch or temporarily store pieces of data sequentially received from the shift register 330 and transmit the received pieces of data to the decoder 350.

The decoder 350 may use the gamma voltages VG0 to VG2047 to convert the corrected digital input value in the third data DATA3 in a digital format into a data signal VGS (or data voltage) in an analog format. For example, the decoder 350 may generate the data signal VGS by selecting a gamma voltage corresponding to the corrected digital input value in the third data DATA3 from among the gamma voltages VG0 to VG2047.

Here, since the controller 310 generates the third data DATA3 by correcting a digital input value of the second data DATA2, the data signal VGS generated by the decoder 350 may be non-linear with respect to a grayscale value. For example, the data signal VGS may correspond to values positioned on a gamma curve (for example, a 2.2 gamma curve) for a grayscale value.

The output buffer 360 may receive and output the data signal VGS to a corresponding data line DL among data lines DL (in other words, the data lines DL1 to DLm of the display unit 110 described with reference to FIG. 1). The output buffer 360 may include source buffers 361 each of which is connected to the corresponding data line DL among the data lines DL, and the source buffer 361 may receive the data signal VGS from the decoder 350 and may output the data signal VGS to the pixel PX through the data line DL. The source buffer 361 may also receive the data signal VGS fed back thereto as an input.

Figure 5:
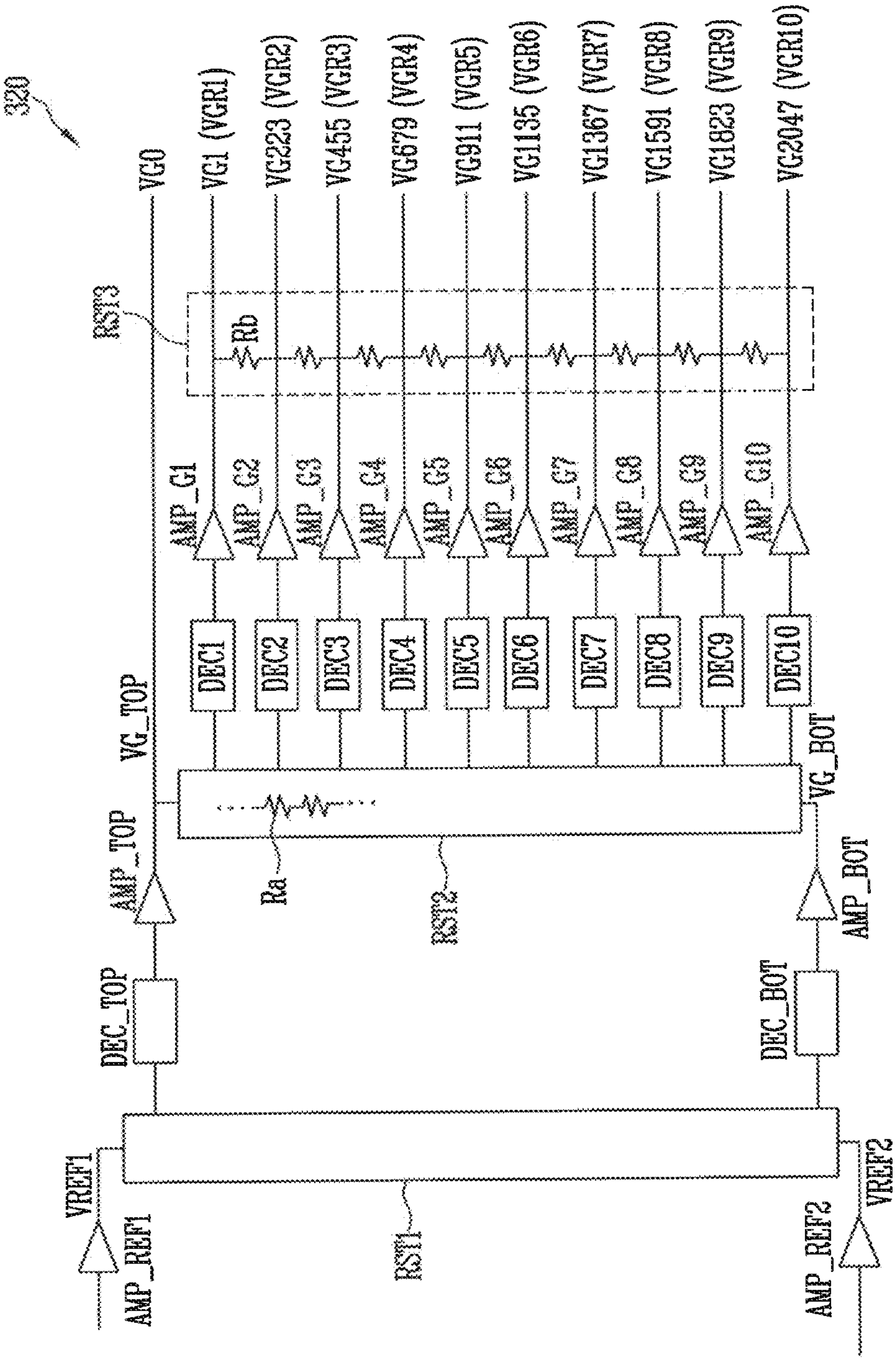
FIG. 5 is a circuit diagram illustrating an example of a gamma voltage generator included in the data driver of FIG. 3.
Figure 6:
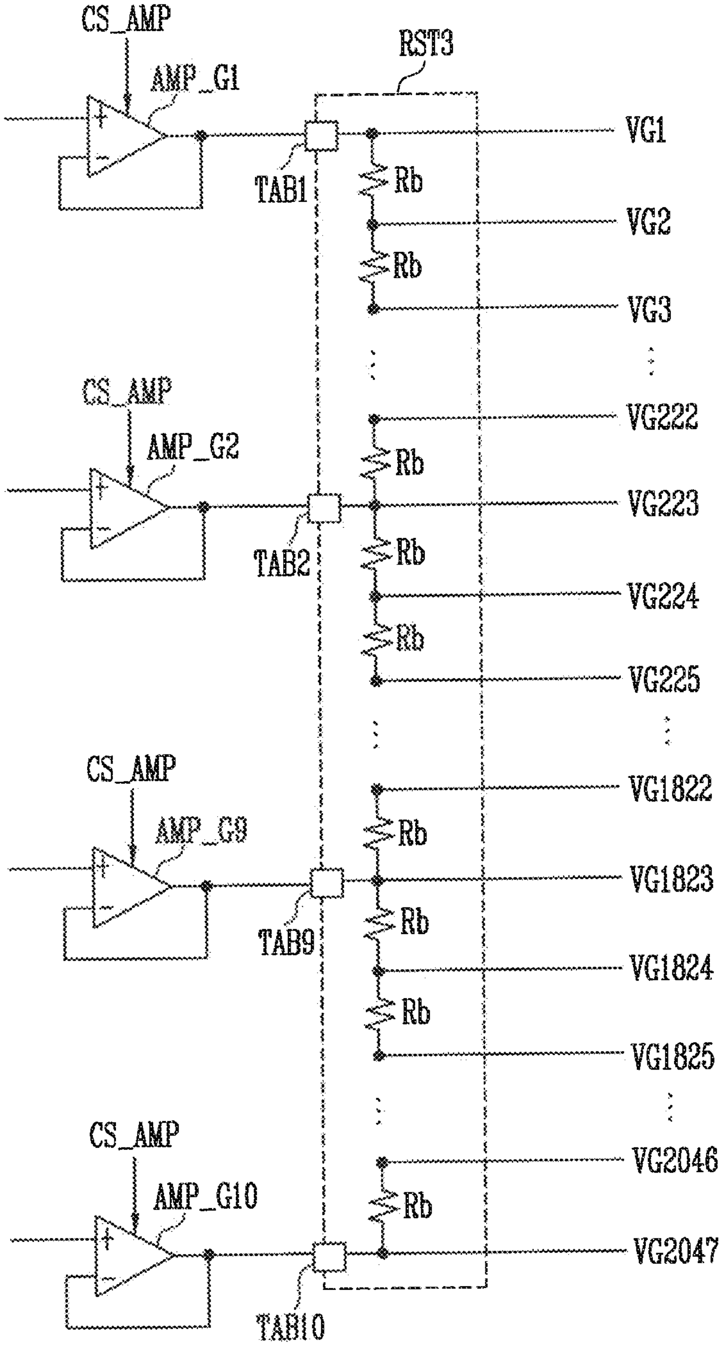
FIG. 6 is a circuit diagram illustrating an example of gamma buffers connected to a third resistor string included in the gamma voltage generator of FIG. 5.

FIG. 5 is a circuit diagram illustrating an example of a gamma voltage generator included in the data driver of FIG. 3. FIG. 6 is a circuit diagram illustrating an example of gamma buffers connected to a third resistor string included in the gamma voltage generator of FIG. 5.

Referring to FIGS. 3 to 5, a gamma voltage generator 320 may include a first resistance string RST1, a second resistance string RST2, a third resistance string RST3, a first reference selector DEC_TOP, a second reference selector DEC_BOT, first, second, third, fourth, fifth, sixth, seventh, eighth, ninth and tenth selectors DEC1, DEC2, DEC3, DEC4, DEC5, DEC6, DEC7, DEC8, DEC9 and DEC10, a first reference buffer AMP_REF1, a second reference buffer AMP_REF2, a first buffer AMP_TOP, a second buffer AMP_BOT, and first, second, third, fourth, fifth, sixth, seventh, eighth, ninth and tenth gamma buffers AMP_G1, AMP_G2, AMP_G3, AMP_G4, AMP_G5, AMP_G6, AMP_G7, AMP_G8, AMP_G9 and AMP_G10 (or first, second, third, fourth, fifth, sixth, seventh, eighth, ninth and tenth gamma amplifiers). Although ten gamma buffers AMP_G1 to AMP_G10 are illustrated in FIG. 5, this is merely an example, and the number of the gamma buffers may be variously changed as needed.

The first reference buffer AMP_REF1 may output a first reference voltage VREF1, and the second reference buffer AMP_REF2 may output a second reference voltage VREF2. Here, the first reference voltage VREF1 may be a maximum voltage of gamma voltages VG0 to VG2047, the second reference voltage VREF2 may be a minimum voltage of the gamma voltages VG0 to VG2047, and each of the first and second reference voltages VREF1 and VREF2 may be set based on a driving voltage (or a power voltage) applied to the gamma voltage generator 320. For example, each of the first and second reference voltages VREF1 and VREF2 may be selected from among voltages obtained by dividing the driving voltage applied to the gamma voltage generator 320 and may be supplied to the first and second reference buffers AMP_REF1 and AMP_REF2.

The first resistor string RST1 includes a plurality of resistors, and a voltage between the first reference voltage VREF1 and the second reference voltage VREF2 may be divided by the resistors.

The first reference selector DEC_TOP may select one from the voltages divided by the first resistor string RST1, and the first buffer AMP_TOP may output one selected from the divided voltages as a maximum gamma voltage VG_TOP. Here, the maximum gamma voltage VG_TOP may be set as a gamma voltage having the highest voltage level among the gamma voltages VG0 to VG2047 (for example, a reference gamma voltage VG0 corresponding to a minimum gray scale).

Similarly, the second reference selector DEC_BOT may select another one from the voltages divided by the first resistor string RST1, and the second buffer AMP_BOT may output another one selected from the divided voltages as a minimum gamma voltage VG_BOT. Here, the minimum gamma voltage VG_BOT may be a minimum value in a range of the gamma voltages VG0 to VG2047.

Each of the first and second reference selectors DEC_TOP and DEC_BOT may be implemented as a 12-bit decoder, but this is merely an example, and the present invention is not limited thereto.

The second resistor string RST2 may include a plurality of first resistors Ra and may set the range of the gamma voltages VG0 to VG2047. The maximum gamma voltage VG_TOP may be provided to one end (for example, an upper tap) of the second resistor string RST2, the minimum gamma voltage VG_BOT may be provided to the other end (for example, a lower tap) of the second resistor string RST2, and the second resistor string RST2 may divide a voltage between the maximum gamma voltage VG_TOP and the minimum gamma voltage VG_BOT through the first resistors Ra. The first resistors Ra may have the same resistance value.

The first selector DEC1 may select one from voltages divided by the second resistor string RST2, the first gamma buffer AMP_G1 may output the one selected from the voltages divided by the second resistor string RST2, and the one selected from the divided voltages by the first selector DEC1 may be set as a gamma voltage of a minimum gray scale (or a first gamma voltage VG1, a first representative gamma voltage VGR1, or a first tap gamma voltage).

Similarly, each of the second to tenth selectors DEC2 to DEC10 selects one from the voltages divided by the second resistor string RST2, and the second to tenth gamma buffers AMP_G2 to AMP_G10 may output voltages selected by the second to tenth selectors DEC2 to DEC10. For example, the second selector DEC2 may select one from voltages divided by the second resistor string RST2, the second gamma buffer AMP_G2 may output the one selected from the voltages divided by the second resistor string RST2, and the one selected from the divided voltages by the second selector DEC2 may be set as a gamma voltage of an intermediate gray scale. A voltage selected by the tenth selector DEC10 and output through the tenth gamma buffer AMP_G10 may be set as the gamma voltage VG2047 of a maximum gray scale (a tenth representative gamma voltage VGR10 or a tenth tap gamma voltage), and voltages output through the second to ninth gamma buffers AMP_G2 to AMP_G9 may be set as the gamma voltages VG223, VG455, VG679, VG911, VG1135, VG1367, VG1591, and VG1823 of intermediate gray scales (or second to ninth representative gamma voltages VGR2, VGR3, VGR4, VG5, VG6, VG7, VGR8 and VGR9, second to ninth tap gamma voltages, or tap gamma voltages of intermediate gray scales).

Each of the first to tenth selectors DEC1 to DEC10 may be implemented as a 13-bit decoder, but this is merely an example, and the present invention is not limited thereto.

The gamma voltages VG1, VG223, VG455, VG679, VG911, VG1135, VG1367, VG1591, VG1823, and VG2047 (or tap gamma voltages) output through the first to tenth gamma buffers AMP_G1 to AMP_G10 may be set at equal intervals from each other.

A third resistor string RST3 may include a plurality of second resistors Rb and may generate the gamma voltages VG1 to VG2047 within the range of the gamma voltages set in the second resistor string RST2. The second resistors Rb may mutually have the same resistance value.

As shown in FIG. 6, the first to tenth gamma buffers AMP_G1 to AMP_G10 may be connected to specific taps (or specific tap points) of the third resistance string RST3, may reduce resistive-capacitive (RC) delays of the gamma voltages VG1, VG223, VG455, VG679, VG911, VG1135, VG1367, VG1591, VG1823, and VG2047, and may reduce setting times of the gamma voltages VG1, VG223, VG455, VG679, VG911, VG1135, VG1367, VG1591, VG1823, and VG2047. Each of the first to tenth gamma buffers AMP_G1 to AMP_G10 may be provided with a control signal CS_AMP. The control signal CS_AMP may be a power voltage. In other words, the first to tenth gamma buffers AMP_G1 to AMP_G10 may be rapidly charged with the gamma voltages VG1, VG223, VG455, VG679, VG911, VG1135, VG1367, VG1591, VG1823, and VG2047 to target gamma voltages, thereby improving the linearity of the gamma voltages and more easily controlling the gamma voltages. In embodiments of the present invention, the second buffer AMP_BOT may vary the minimum gamma voltage VG_BOT based on a gamma voltage control signal GVCS. Accordingly, the range of the gamma voltages VG0 to VG2047 may be adjusted.

For example, when a value of the minimum gamma voltage VG_BOT is decreased with respect to the same maximum gamma voltage VG_TOP, the range of the gamma voltages VG0 to VG2047 may be widened, and among the gamma voltages VG0 to VG2047, values of the remaining gamma voltages except for the reference gamma voltage VG0 corresponding to the minimum gray scale may be decreased. In this case, a gamma voltage selected for the same digital input value, in other words, a voltage level of a data signal may be decreased. In other words, when a target luminance level of a display image is increased, the controller 310 may generate the gamma voltage control signal GVCS for controlling the gamma voltage generator 320 to decrease a magnitude of the minimum gamma voltage VG_BOT based on a luminance control signal LCS. Accordingly, since the range of the gamma voltages VG0 to VG2047 generated by the gamma voltage generator 320 is widened, a luminance of the display image may be increased in response to the target luminance level of the display image.

In another example, when a value of the minimum gamma voltage VG_BOT is increased with respect to the same maximum gamma voltage VG_TOP, the range of the gamma voltages VG0 to VG2047 may be narrowed, and among the gamma voltages VG0 to VG2047, values of the remaining gamma voltages except for the reference gamma voltage VG0 corresponding to the minimum gray scale may be increased. In this case, a gamma voltage selected for the same digital input value, in other words, a voltage level of a data signal may be increased. In other words, when a target luminance level of a display image is decreased, the controller 310 may generate the gamma voltage control signal GVCS for controlling the gamma voltage generator 320 to increase a magnitude of the minimum gamma voltage VG_BOT based on the luminance control signal LCS. Accordingly, since the range of the gamma voltages VG0 to VG2047 generated by the gamma voltage generator 320 is narrowed, a luminance of the display image may be decreased in response to the target luminance level of the display image.

The embodiments of the present invention are not limited thereto, and according to the embodiments of the present invention, to adjust the range of the gamma voltages VG0 to VG2047, the first buffer AMP_TOP may vary the maximum gamma voltage VG_TOP based on the gamma voltage control signal GVCS.

Figure 7:
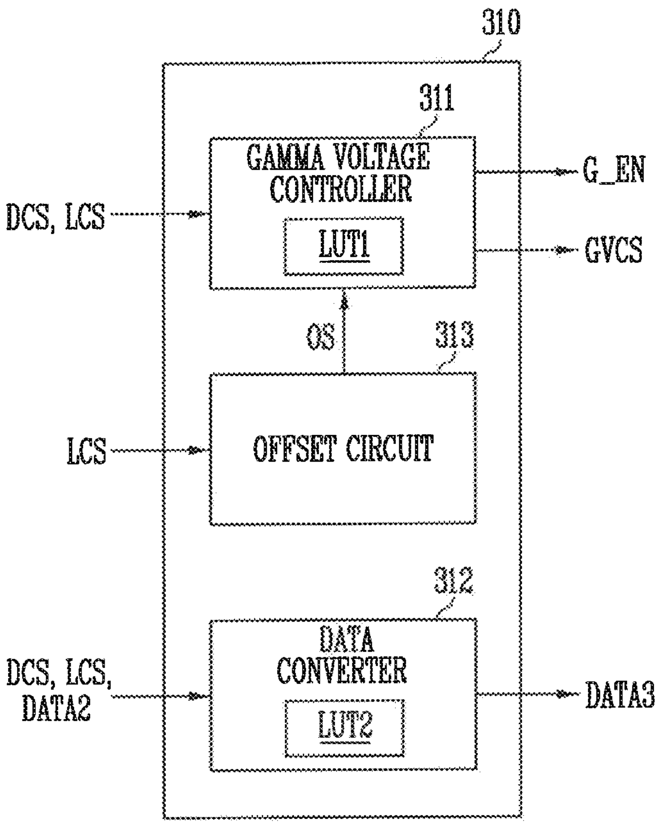
FIG. 7 is a block diagram illustrating an example of a controller included in the data driver of FIG. 3.
Figure 8:
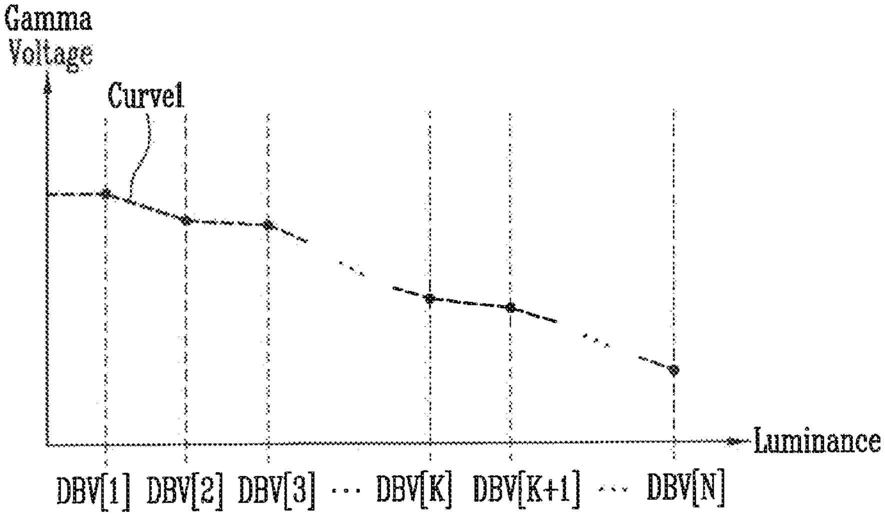
FIG. 8 is a graph for describing a first look-up table stored in a gamma voltage controller included in the controller of FIG. 7.
Figure 9:
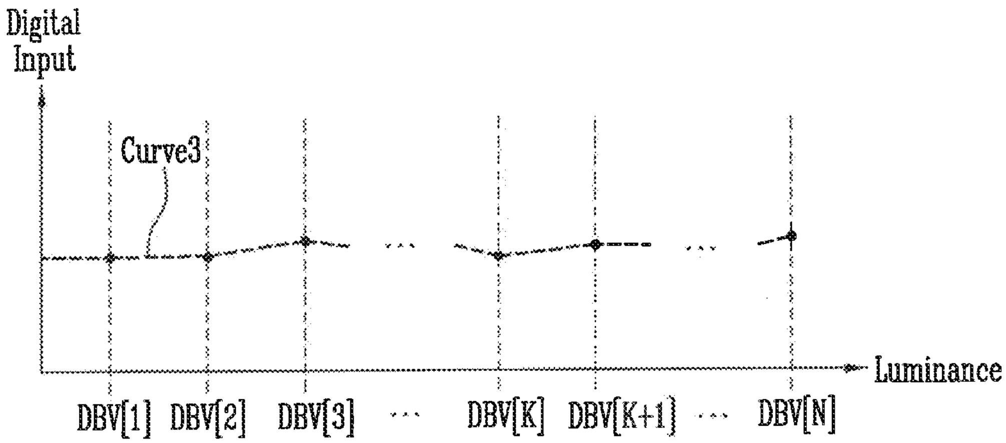
FIG. 9 is a graph for describing a second look-up table stored in a data converter included in the controller of FIG. 7.
Figure 10:
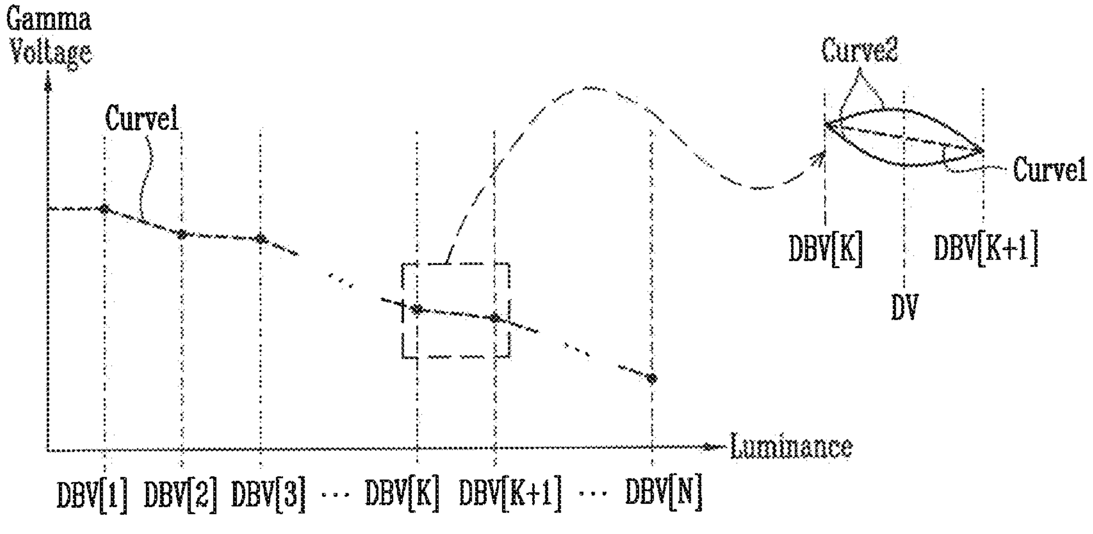
FIG. 10 is a graph for describing an operation of an offset circuit included in the controller of FIG. 7.
Figures 11A, 11B:
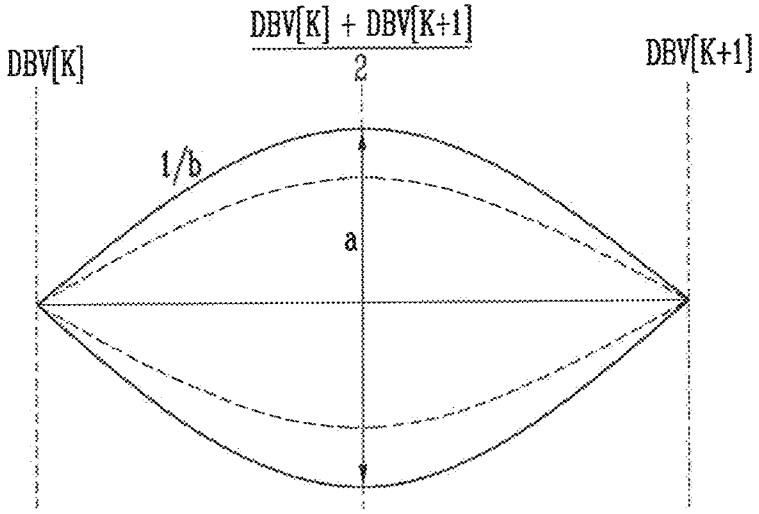

FIG. 7 is a block diagram illustrating an example of a controller included in the data driver of FIG. 3. FIG. 8 is a graph for describing a first look-up table stored in a gamma voltage controller included in the controller of FIG. 7. FIG. 9 is a graph for describing a second look-up table stored in a data converter included in the controller of FIG. 7. FIG. 10 is a graph for describing an operation of an offset circuit included in the controller of FIG. 7. FIGS. 11A to 11C are diagrams for describing an operation of the offset circuit included in the controller of FIG. 7.

As described with reference to FIG. 1, a display device 100 (or a data driver 140) according to embodiments of the present invention may set the entire range of gamma voltages using an offset value. Hereinafter, an embodiment of the present invention in which a controller 310 uses an offset value to set the entire range of the gamma voltages will be described with reference to FIGS. 7 to 11C.

Referring to FIGS. 3, 5, and 7, the controller 310 may include a gamma voltage controller 311, a data converter 312, and an offset circuit 313.

The gamma voltage controller 311 may generate a gamma enable signal G_EN based on a data control signal DCS and may generate a gamma voltage control signal GVCS based on a luminance control signal LCS.

In an embodiment of the present invention, the gamma voltage controller 311 may include a first look-up table LUT1 and may generate the gamma voltage control signal GVCS corresponding to a target luminance level of a display image using the first look-up table LUT1.

For example, referring further to FIG. 8, gamma voltage information about sample luminance levels DBV[1] to DBV[N] among all luminance levels may be pre-stored in the first look-up table LUT1. Here, the gamma voltage information may refer to information about a magnitude of the minimum gamma voltage VG_BOT described with reference to FIGS. 5 and 6.

As described with reference to FIG. 6, in the case of an embodiment of the present invention in which, to adjust a range of gamma voltages VG0 to VG2047, a first buffer AMP_TOP of a gamma voltage generator 320 adjusts a maximum gamma voltage VG_TOP based on the gamma voltage control signal GVCS, the gamma voltage information may refer to information about a magnitude of the maximum gamma voltage VG_TOP.

Hereinafter, a description will be made on the basis that gamma voltage information stored in the first look-up table LUT1 is information about the magnitude of the minimum gamma voltage VG_BOT.

When a target luminance level of a display image is one of the sample luminance levels DBV[1] to DBV[N], the gamma voltage controller 311 may generate the gamma voltage control signal GVCS for controlling the gamma voltage generator 320 to set the minimum gamma voltage VG_BOT to a magnitude of a gamma voltage corresponding to a corresponding sample luminance level stored in the first look-up table LUT1.

The gamma voltage information pre-stored in the first look-up table LUT1 may be determined through an experiment or the like, and accordingly, when the target luminance level is one of the sample luminance levels DBV[1] to DBV[N], the gamma voltage controller 311 may generate the gamma voltage control signal GVCS using only the gamma voltage information pre-stored in the first look-up table LUT1 even without performing a separate additional operation.

However, when the target luminance level of the display image does not correspond to any one of the sample luminance levels DBV[1] to DBV[N] (in other words, when the target luminance level is different from the sample luminance levels in the first look-up table LUT1), the gamma voltage controller 311 needs to calculate gamma voltage information about the target luminance level (in other words, the magnitude of the minimum gamma voltage VG_BOT) using the gamma voltage information pre-stored in the first look-up table LUT1.

Here, when the gamma voltage controller 311 calculates a value of a gamma voltage with respect to the target luminance level (in other words, a value of the minimum gamma voltage VG_BOT) by applying linear interpolation to values of gamma voltages corresponding to the sample luminance levels DBV[1] to DBV[N] (in other words, values of the minimum gamma voltage VG_BOT) (in other words, when the gamma voltage controller 311 calculates a value positioned on a first curve Curve1 as the minimum gamma voltage VG_BOT for the target luminance level), as described with reference to FIG. 1, an actual luminance level of the display image may be different from the target luminance level.

For example, since a voltage level of a data signal applied to a pixel PX (see FIG. 2) is proportional to a voltage level of the gamma voltages VG0 to VG2047, when the gamma voltage controller 311 applies a linear interpolation method to calculate the minimum gamma voltage VG_BOT corresponding to the target luminance level, in response, a voltage level of a data signal may also vary linearly. However, since a relationship between a voltage level of a data signal and a driving current flowing in a light emitting element LD (see FIG. 2) in the pixel PX (see to FIG. 2) is not linear, in response to the driving current, a luminance level of light emitted by the light-emitting element LD (see FIG. 2) in the pixel PX (see FIG. 2) may be different from the target luminance level.

However, when the target luminance level of the display image does not correspond to any one of the sample luminance levels DBV[1] to DBV[N] pre-stored in the first look-up table LUT1, the gamma voltage controller 311 may calculate gamma voltage information about the target luminance level (in other words, the minimum gamma voltage VG_BOT) using the gamma voltage information pre-stored in the first look-up table LUT1 and an offset value OS calculated by the offset circuit 313.

The offset circuit 313 may receive the luminance control signal LCS and may calculate the offset value OS in response to a target luminance level of a display image included in the luminance control signal LCS.

In an embodiment of the present invention, the offset circuit 313 may calculate the offset value OS using values of two sample luminance levels (or a first sample luminance level and a second sample luminance level) among the sample luminance levels DBV[1] to DBV[N] and a value of the target luminance level. Here, the first sample luminance level and the second sample luminance level may correspond to two sample luminance levels having the smallest difference from the target luminance level among the sample luminance levels DBV[1] to DBV[N]. For example, the offset circuit 313 may calculate the offset value OS using Equation 1 below.

$$OS = a\times\left[DV-\left(\frac{DBV1+DBV2}{2}\right)\right]^{\frac{1}{b}} \quad \text{[Equation 1]}$$

Here, OS may denote the offset value OS, DV may denote the target luminance level of the display image, and DBV1 and DBV2 may denote the above-described two sample luminance levels. In addition, a and b may correspond to a first proportional constant and a second proportional constant determined in consideration of emission characteristics of a pixel PX (see FIG. 2), respectively.

Such [Equation 1] may be a relational expression for reflecting a non-linear relationship between a voltage level of a data signal applied to the pixel PX (see FIG. 2) and a driving current according to emission characteristics of the pixel PX (see FIG. 2) and may correspond to a relational expression determined through experiments or the like. The offset circuit 313 may calculate the offset value OS using such a relational expression.

The gamma voltage controller 311 may apply (for example, add) the offset value OS to values calculated by applying a linear interpolation method to the values of the minimum gamma voltage VG_BOT corresponding to the sample luminance levels DBV[1] to DBV[N], thereby calculating the minimum gamma voltage VG_BOT corresponding to a target luminance level.

For example, referring further to FIG. 10, values, which are calculated by applying a linear interpolation method to the values of the minimum gamma voltage VG_BOT corresponding to the sample luminance levels DBV[1] to DBV[N] by the gamma voltage controller 311, may be positioned a first curve Curve1, and the minimum gamma voltage VG_BOT calculated by applying the offset value OS may be positioned on a second curve Curve2. As shown in FIG. 10, in the case of the second curve Curve2, a value of a gamma voltage (in other words, the minimum gamma voltage VG_BOT) may be changed nonlinearly according to a change in a luminance level between the $K^{th}$ sample luminance level DBV[K] and the $(K+1)^{th}$ sample luminance level DBV[K+1]. Accordingly, a voltage level of a data signal applied to the pixel PX (see FIG. 2) may be changed nonlinearly according to a change in a luminance level (for example, like a relationship between a driving current and a data signal described with reference to FIG. 2).

For convenience of description, FIG. 10 shows only the second curve Curve2 between the $K^{th}$ sample luminance level DBV[K] and the $(K+1)^{th}$ sample luminance level DBV[K+1] corresponding to a region to which a target luminance level DV belongs among areas between two adjacent sample luminance levels among the sample luminance levels DBV[1] to DBV[N].

As shown in FIG. 10, a gamma voltage (in other words, the minimum gamma voltage VG_BOT) calculated using the offset value OS may be positioned on the second curve Curve2 having an upward convex shape or the second curve Curve2 having a downward convex shape according to values of the first proportional constant a and the second proportional constant b.

According to embodiments of the present invention, in [Equation 1], the first proportional constant a may be determined in response to a gain (or a magnitude) of the offset value OS, and the second proportional constant b may be determined in response to a slope (or an upward or downward convex degree) of the offset value OS having a nonlinear shape (for example, a curved shape). For example, referring further to FIG. 11A, in the offset value OS having a curved shape calculated according to [Equation 1], a gain (or a magnitude) thereof may changed in response to the first proportional constant a, and a slope (or a convex degree) thereof may be changed in response to the proportional constant b.

The first proportional constant a and the second proportional constant b of [Equation 1] may be determined according to a grayscale value in second data DATA2 and a target luminance level of a display image.

For example, referring further to FIGS. 11B and 11C, the offset circuit 313 may determine the first proportional constant a and the second proportional constant b using a look-up table (for example, see Table 1 of FIG. 11B) in which a relationship with the first proportional constant a according to a grayscale value and a target luminance level is provided and/or using a look-up table (for example, see Table 2 of FIG. 11C) in which a relationship with the second proportional constant b according to a grayscale value and a target luminance level is provided. Table 1 may show, for example, a first proportional constant a1 with respect to a grayscale value 0 gradation for the sample luminance level DBV[1], and a second proportional constant b1 with respect to a grayscale value 0 gradation for the sample luminance level DBV[1].

According to embodiments of the present invention, to minimize the number of values of proportional constants which are to be stored, each of the look-up table for the first proportionality constant a and/or the look-up table for the second proportionality constant b stores first proportional constants a1 to a42 and/or second proportional constants b1 to b42 with respect to some grayscale values among all grayscale values (for example, 0 gradation, 40 gradation, 80 gradation, 120 gradation, 160 gradation, 200 gradation, and 255 gradation shown in FIGS. 11B and 11C) and the sample luminance levels DBV[1] to DBV[N]) among all luminance levels. The offset circuit 313 may determine the first proportional constant a and/or the second proportional constant b with respect to grayscale values and target luminance levels not stored in the look-up table by applying an interpolation method (for example, an linear interpolation method) to the first proportional constants a1 to a42 and/or the second proportional constants b1 to b42 stored in the look-up table.

For example, when a target luminance level is the $K^{th}$ sample luminance level DBV[K] and a grayscale value is 20 gradation, the offset circuit 313 may apply linear interpolation to the first proportional constants (for example, a4 and a10 of FIG. 11B) in which a target luminance level is the $K^{th}$ sample luminance level DBV[K] and grayscale values are 0 gradation and 40 gradation to determine the first proportional constant a in which the target luminance level is the $K^{th}$ sample luminance level DBV[K] and the grayscale value is 20 gradation. In other words, the offset circuit 313 may apply linear interpolation to the first proportional constants a4 and a10, since the grayscale value of 20 gradation is between the grayscale values of 0 gradation and 40 gradation of the first proportional constants a4 and a10. As another example, when a target luminance level is a median value between the $K^{th}$ sample luminance level DBV[K] and the $(K+1)^{th}$ sample luminance level DBV[K+1] and a grayscale value is 80 gradation, the offset circuit 313 may apply linear interpolation to the second proportional constants (for example, b16 and b17 of FIG. 11C) in which a grayscale value is 80 gradation and target luminance levels are the $K^{th}$ sample luminance level DBV[K] and the $(K+1)^{th}$ sample luminance level DBV[K+1] to determine the second proportional constant b in which the target luminance level is the median value between the $K^{th}$ sample luminance level DBV[K] and the $(K+1)^{th}$ sample luminance level DBV[K+1] and the grayscale value is 80 gradation.

Referring again to FIG. 7, the data converter 312 may generate third data DATA3 by correcting a digital input value of the second data DATA2.

In an embodiment of the present invention, the data converter 312 may include a second look-up table LUT2 and may generate the third data DATA3 by correcting the digital input value of the second data DATA2 with a corrected digital input value corresponding to a target luminance level of a display image using the second look-up table LUT2.

For example, referring further to FIG. 9, with respect to grayscale values, corrected digital input values corresponding to the sample luminance levels DBV[1] to DBV[N] among all luminance levels may be pre-stored in the second look-up table LUT2. For convenience of description, only corrected digital input values with respect to each luminance level with respect to one grayscale value are illustrated in FIG. 9.

In other words, when a target luminance level of a display image is one of the sample luminance levels DBV[1] to DBV[N], the data converter 312 may generate the third data DATA3 by correcting the digital input value in the second data DATA2 based on the corrected digital input value stored in the second look-up table LUT2.

The corrected digital input value pre-stored in the second look-up table LUT2 may be determined through experiments or the like, and thus, when a target luminance level of a display image is one of the sample luminance levels DBV[1] to DBV[N], the data converter 312 may generate the third data DATA3 by using only the corrected digital input value with respect to a specific gray level pre-stored in the second look-up table LUT2 without additional calculation.

In addition, when a target luminance level of a display image does not correspond to any one of the sample luminance levels DBV[1] to DBV[N], the data converter 312 may apply interpolation to the corrected digital input values pre-stored in the second look-up table LUT2 to calculate a corrected digital input value with respect to the target luminance level. For example, the data converter 312 may calculate a corrected digital input value with respect to a target luminance level by applying a linear interpolation method (in other words, a value positioned on a third curve Curve3 is calculated as the corrected digital input value).

As described with reference to FIGS. 3, 5, and 7 to 11C, in consideration of emission characteristic of the pixel PX (see FIG. 2), the data driver 140 (or the controller 310) according to embodiments of the present invention may set the entire range of the gamma voltages VG0 to VG2047 corresponding to the target luminance level DV using the offset value OS corresponding to the target luminance level DV of a display image, thereby displaying an image at a luminance corresponding to target luminance through the display unit 110.

According to an embodiment of the present invention, the display device 100 may include a display panel 110 including scan lines SL11 to SL1*n*, SL21 to SL2*n*, SL31 to SL3*n*, and SL41 to SL4*n*, data lines DL1-DLm, and pixels PX connected to the scan lines SL11 to SL1*n*, SL21 to SL2*n*, SL31 to SL3*n*, and SL41 to SL4*n* and the data lines DL1-DLm; a scan driver 120 configured to provide a scan signal to one of the scan lines SL11 to SL1*n*, SL21 to SL2*n*, SL31 to SL3*n*, and SL41 to SL4*n*; and a data driver 140 configured to generate a data signal based on image data DATA1 and provide the data signal to one of the data lines DL1-DLm, wherein the data driver 140 includes: a controller 310 configured to generate a gamma voltage control signal GVCS with respect to gamma voltage information corresponding to a target luminance level of an image displayed by the display panel 110; a gamma voltage generator 320 configured to generate gamma voltages VG0-VG2047 having a voltage range corresponding to the target luminance level based on the gamma voltage control signal GVCS; and a decoder 350 configured to generate the data signal corresponding to a grayscale value using the gamma voltages VG0-VG2047, and wherein the controller 310 calculates an offset value OS corresponding to the target luminance level and applies the offset value to values obtained using gamma voltage information about sample luminance levels to obtain gamma voltage information corresponding to the target luminance level.

Figure 12:
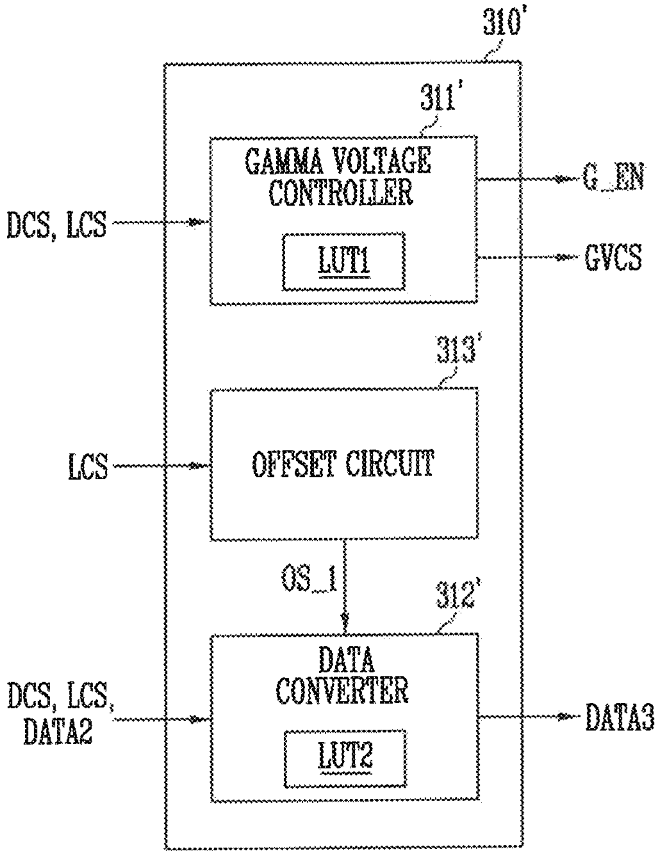
FIG. 12 is a block diagram illustrating an example of a controller included in the data driver of FIG. 3.
Figure 13:
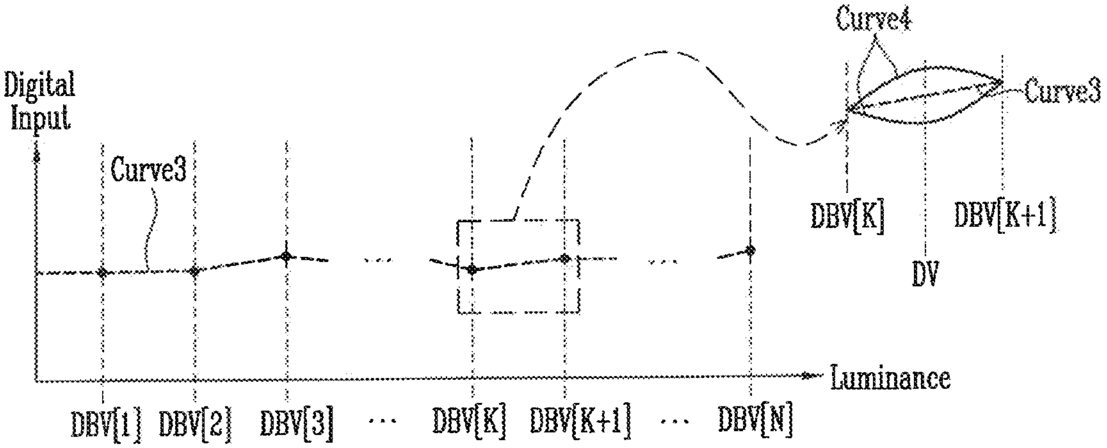
FIG. 13 is a graph for describing an operation of an offset circuit included in the controller of FIG. 12.

FIG. 12 is a block diagram illustrating an example of a controller included in the data driver of FIG. 3. FIG. 13 is a graph for describing an operation of an offset circuit included in the controller of FIG. 12.

As described with reference to FIG. 1, a display device 100 (or a data driver 140) according to embodiments of the present invention may correct a digital input value using an offset value. Hereinafter, an embodiment of the present invention in which a controller 310' uses an offset value to correct digital data will be described with reference to FIGS. 12 and 13, and descriptions of contents that overlap those described with reference to FIGS. 7 to 11C may not be repeated.

Referring to FIG. 12, the controller 310' may include a gamma voltage controller 311', a data converter 312', and an offset circuit 313'.

The gamma voltage controller 311' may generate a gamma enable signal G_EN and a gamma voltage control signal GVCS.

In an embodiment of the present invention, the gamma voltage controller 311' may include a first look-up table LUT1 and may generate the gamma voltage control signal GVCS corresponding to a target luminance level of a display image using the first look-up table LUT1.

Here, when a target luminance level of a display image is one of sample luminance levels DBV[1] to DBV[N], as described with reference to FIGS. 7 to 11C, the gamma voltage controller 311' may generate gamma the voltage control signal GVCS for controlling the gamma voltage generator 320 to set a minimum gamma voltage VG_BOT to a magnitude of a gamma voltage corresponding to a corresponding sample luminance level stored in the first look-up table LUT1.

In addition, when a target luminance level does not correspond to any one of the sample luminance levels DBV[1] to DBV[N], the gamma voltage controller 311' may apply an interpolation method to gamma voltages pre-stored in the first look-up table LUT1 to calculate a value of a gamma voltage (in other words, a value of the minimum gamma voltage VG_BOT) with respect to the target luminance level. For example, the gamma voltage controller 311' may calculate a value of a gamma voltage with respect to a target luminance level by applying a linear interpolation method (in other words, a value positioned on the first curve Curve1 of FIG. 8 is calculated as the value of the gamma voltage).

The data converter 312' may generate third data DATA3 by correcting a digital input value of second data DATA2.

In an embodiment of the present invention, the data converter 312' may include a second look-up table LUT2 and may generate the third data DATA3 by correcting the digital input value of the second data DATA2 with a corrected digital input value corresponding to a target luminance level of a display image using the second look-up table LUT2.

Here, when a target luminance level of a display image is one of the sample luminance levels DBV[1] to DBV[N], as described with reference to FIGS. 7 to 11C, the data converter 312' may generate the third data DATA3 by correcting the digital input value in the second data DATA2 with the corrected digital input value stored in the second look-up table LUT2.

However, when a target luminance level of a display image does not correspond to any one of the sample luminance levels DBV[1] to DBV[N], the data converter 312' needs to calculate a corrected digital input value with respect to the target luminance level using the corrected digital input value pre-stored in the second look-up table LUT2.

In this case, the data converter 312' may calculate the corrected digital input value with respect to the target luminance level using the corrected digital input value pre-stored in the second look-up table LUT2 and an offset value OS_1 calculated in the offset circuit 312', thereby converting the second data DATA2 into the third data DATA3.

Here, a configuration in which the offset circuit 313' calculates the offset value OS_1 may be substantially similar to a configuration in which the offset circuit 313 calculates the offset value OS_1 described with reference to FIGS. 7 to 11C. For example, as compared with the offset circuit 313 of FIG. 7, the offset circuit 313' may calculate the offset value OS_1 using Equation 1 described above in a substantially similar manner as in the offset circuit 313 of FIG. 7 except that a value of a first proportional constant and a value of a second proportional constant of [Equation 1] are determined in response to a digital input value.

The data converter 312' may apply (for example, adding) the offset value OS_1 to values calculated by applying a linear interpolation method to corrected digital input values corresponding to the sample luminance levels DBV[1] to DBV[N], thereby calculating a corrected digital input value corresponding to a target luminance level.

For example, referring further to FIG. 13, values, which are calculated by applying a linear interpolation method to the corrected digital input values corresponding to the sample luminance levels DBV[1] to DBV[N], may be positioned on a third curve Curve3, and the corrected digital input value calculated by applying the offset value OS_1 may be positioned on a fourth curve Curve4. As shown in FIG. 13, in the case of the fourth Curve4, the corrected digital input value may be changed nonlinearly according to a change in a luminance level between a $K^{th}$ sample luminance level DBV[K] and a $(K+1)^{th}$ sample luminance level DBV[K+1]. Accordingly, a voltage level of a data signal applied to a pixel PX (see FIG. 2) may be changed nonlinearly according to a change in a luminance level (for example, like a relationship between a driving current and a data signal described with reference to FIG. 2).

For convenience of description, FIG. 13 shows only the fourth curve Curve4 between the $K^{th}$ sample luminance level DBV[K] and the $(K+1)^{th}$ sample luminance level DBV[K+1] corresponding to a region to which a target luminance level DV belongs among areas between two adjacent sample luminance levels among the sample luminance levels DBV[1] to DBV[N].

As shown in FIG. 13, the corrected digital input value calculated using the offset value OS_1 may be positioned on the fourth curve Curve4 having an upward convex shape or the fourth curve Curve4 having a downward convex shape according to the above-described values of the first and second proportional constants.

In a display device according to embodiments of the present invention, an offset value corresponding to a target luminance level of a display image is calculated in consideration of emission characteristics of pixels, thereby setting a voltage range of gamma voltages corresponding to a target luminance level and/or correcting a digital input value of image data.

Accordingly, the display device can display an image at a luminance corresponding to the target luminance level.

However, features of the present invention are not limited thereto.

Although embodiments of the present invention have been described, it is understood that the present invention should not be limited to these embodiments but various changes and modifications can be made by one ordinary skilled in the art.

What is claimed is:

1. A display device, comprising:

a display panel including scan lines, data lines, and pixels connected to the scan lines and the data lines;

a timing controller configured to convert first data to serialized second data;

a scan driver configured to provide a scan signal to one of the scan lines; and a data driver configured to generate a data signal based on the serialized second data and provide the data signal to one of the data lines, wherein the data driver includes:

a shift register;

a controller configured to generate a gamma voltage control signal with respect to gamma voltage information corresponding to a target luminance level of an image displayed by the display panel and covert the serialized second data received from the timing controller to parallelized third data and provide the parallelized third data to the shift register;

a gamma voltage generator configured to generate gamma voltages having a voltage range corresponding to the target luminance level based on the gamma voltage control signal; and a decoder configured to generate the data signal corresponding to a grayscale value using the gamma voltages, wherein the controller calculates an offset value corresponding to the target luminance level and applies the offset value to values obtained using gamma voltage information about sample luminance levels to obtain the gamma voltage information corresponding to the target luminance level, and wherein the offset value is calculated using Equation 1 below:

$$OS = a \times \left[DV - \left(\frac{DBV1 + DBV2}{2}\right)\right]^{\frac{1}{b}}, \qquad \text{[Equation 1]}$$

wherein, in Equation 1, OS denotes the offset value, DV denotes the target luminance level, DBV1 and DBV2 denote a first sample luminance level and a second sample luminance level that have the smallest difference from the target luminance level among the sample luminance levels, and a and b are proportional constants according to emission characteristics of the pixel.

2. The display device of claim 1, wherein the controller includes:

a gamma voltage controller configured to calculate the gamma voltage information corresponding to the target luminance level using a first look-up table; and an offset circuit configured to calculate the offset value, and wherein the gamma voltage information about the sample luminance levels is pre-stored in the first look-up table.

3. The display device of claim 2, wherein, when the target luminance level is different from the sample luminance levels, the gamma voltage controller calculates the gamma voltage information corresponding to the target luminance level by applying the offset value to values calculated by applying a linear interpolation method to the gamma voltage information about the sample luminance levels.

4. The display device of claim 2, wherein, when the target luminance level is one of the sample luminance levels, the gamma voltage controller calculates target gamma voltage information, which corresponds to a sample luminance level equal to the target luminance level among the gamma voltage information stored in the first look-up table, as gamma voltage information about the target luminance level.

5. The display device of claim 2, wherein the controller further includes a data converter configured to generate the parallelized third data by correcting a digital input value of the serialized second data with a corrected digital input value, and wherein the decoder generates the data signal by selecting a gamma voltage corresponding to the corrected digital input value of the parallelized third data among the gamma voltages.

6. The display device of claim 5, wherein the data converter generates the corrected digital input value using a second look-up table, and wherein corrected digital input values with respect to the sample luminance levels are pre-stored in the second look-up table.

7. The display device of claim 6, wherein, when the target luminance level is one of the sample luminance levels, the data converter calculates a corrected digital input value, which corresponds to a sample luminance level equal to the target luminance level among the corrected digital input values stored in the second look-up table, as a corrected digital input value of the target luminance level.

8. The display device of claim 6, wherein, when the target luminance level is different from the sample luminance levels, the data converter calculates a value, which is calculated by applying a linear interpolation method to the corrected digital input values with respect to the sample luminance levels, as a corrected digital input value of the target luminance level.

9. The display device of claim 1, wherein the gamma voltage generator includes:

a first resistor string configured to set the voltage range of the gamma voltages;

gamma buffers configured to output some voltages divided within the voltage range;

a second resistor string which includes tabs connected to output terminals of the gamma buffers and divides a voltage between the taps to generate the gamma voltages;

a first buffer configured to apply a maximum gamma voltage to a first end of the first resistor string; and a second buffer configured to apply a minimum gamma voltage to a second end of the first resistor string, and wherein the maximum gamma voltage of the first buffer or the minimum gamma voltage of the second buffer is changed according to the target luminance level.

* * * * *